(12) United States Patent
Liu et al.

(10) Patent No.: US 6,994,537 B2
(45) Date of Patent: Feb. 7, 2006

(54) ELECTRICAL INJECTION VELOCITY-PRESSURE SWITCHING AND PRESSURE HOLDING DEVICE

(75) Inventors: Hsing Chang Liu, Hinchu (TW); Yu-Wei Chien, Hinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 210 days.

(21) Appl. No.: 10/422,746

(22) Filed: Apr. 25, 2003

(65) Prior Publication Data

US 2004/0119183 A1    Jun. 24, 2004

(30) Foreign Application Priority Data

Dec. 19, 2002    (TW) ................................ 91136618 A (51) Int. Cl.
    *B29C 45/77* (2006.01)
(52) U.S. Cl. ...................... 425/143; 425/145; 264/40.1
(58) Field of Classification Search ................ 425/143, 425/145, 149; 264/40.1
    See application file for complete search history.

(56) References Cited

U.S. PATENT DOCUMENTS

| | | | |
|---|---|---|---|
| 4,988,273 A | * | 1/1991 | Faig et al. .................. 425/145 |
| 5,154,935 A | | 10/1992 | Kamiguchi et al. |
| 5,362,222 A | * | 11/1994 | Faig et al. .................. 425/145 |
| 5,551,857 A | * | 9/1996 | Fujioka et al. .............. 425/143 |
| 5,997,778 A | * | 12/1999 | Bulgrin ..................... 264/40.1 |
| 6,468,064 B1 | * | 10/2002 | Kamiguti et al. ........... 425/145 |

* cited by examiner

*Primary Examiner*—Tim Heitbrink
(74) *Attorney, Agent, or Firm*—Rabin & Berdo, P.C.

(57) ABSTRACT

A velocity-pressure switching and pressure holding device and system for electrically-operated injection molding machines. The switching between closed-loop position control and closed-loop pressure control of a servo motor of an injection molding machine is quickly and smoothly achieved by a switchable loop switch to ensure the optimal control of the velocity-pressure switching during injection filling and pressure holding. Furthermore an adjustable observation value and a speed reducing set up for the injection axle before switching are provided to allow users to perform minor adjustments on the velocity-pressure switching during the slow down of the injection axle. The present invention easily and precisely achieves the optimal velocity-pressure switching parameters to facilitate better pressure holding ability to increase the quality of the plastic products.

10 Claims, 8 Drawing Sheets

ELECTRICAL INJECTION VELOCITY-PRESSURE SWITCHING AND PRESSURE HOLDING DEVICE

FIELD OF THE INVENTION

The present invention generally relates to an electrical injection velocity-pressure switching and pressure holding device and method thereof; and particularly, related to an electrical injection velocity-pressure switching and pressure holding device and method thereof which easily and precisely achieves the optimal V-P switching.

BACKGROUND OF THE RELATED ART

Figure 5:
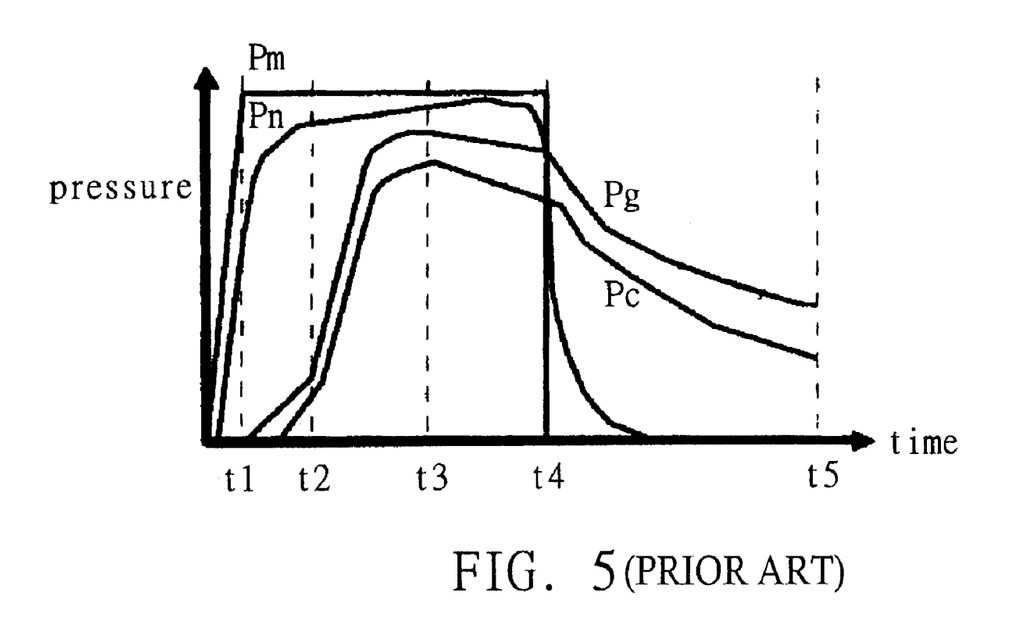
FIGS. 5 and 5A show a conventional variation in pressure and position during the injection molding process.
Figure 5A:
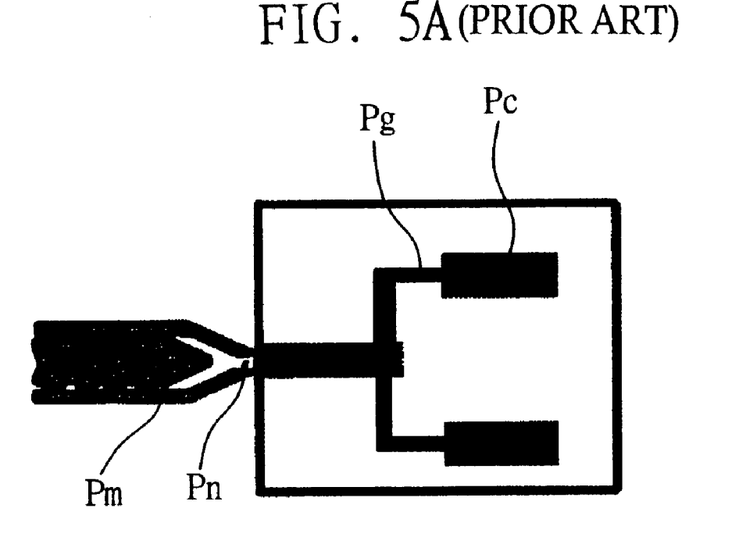

High-volume injection molding machines can be either categorized by the type of injection unit or clamping unit regardless of the molding material. There are two main categories of injection units are the ram type and the screw type and two main categories of clamping units are the hydraulic type and the mechanical type. The source of the driving unit can be either hydraulic or electrical. The stringent control of the hold pressure of the injection process is the key element to controlling the final quality of the plastic molds. Common problems such as surface wrinkles, warpage, distortion, flash, bleeding, air holes, and short fill are usually caused the deficient fill or hold pressure during the injection process. FIGS. 4A to 4E consecutively illustrate the injection process of a hydraulic screw type injection molding machine for the steps of locking the mold, injection, holding the pressure, cooling, and releasing the mold. The relationship in the pressure variation and deviation in every step after the injection have direct effect on the quality of the sample dies, especially in FIGS. 4B and 4C for the steps of injection and holding the pressure where the switching pressure and switching position (the position of the injection axle) are of crucial importance. If the position is switched too early a short fill situation will occur, and oppositely if the position is switched too late a bleeding situation will occur. Similarly if the switching pressure is too high the plastic will have obvious parting lines, and oppositely if the switching pressure is unstable (the switching speed variation is too high) the plastic will experience peaky and unsmooth surfaces. Furthermore the switching position and the switching pressure also determine the value of the hold pressure in the subsequent step for compressing the resin to increase the density in FIG. 4C. If the hold pressure is too high the plastic melt will adhere to the wall and cannot release properly whose residual will further cause flash or bleeding and if the hold pressure is severely high the mold will be forced open. Oppositely if the hold pressure is too low the plastic will encounter warpage or have air holes which decreases the quality of the plastic. From the above description, it is to be understood that the injection switching is of high importance and yet the precise adjustment cannot be easily achieved. Please refer to FIGS. 5 and 5A for another example, the difficulty in controlling the hold pressure is illustrated, the Pm curve represents the pressure in the screw metering zone of the injection unit which is actually the default pressure curve. The Pn curve represents the pressure at the end of the nozzle, the Pg curve represents the pressure at the cavity entrance, and the Pc curve represents the pressure at the cavity exit. The Pc curve lies below the Pg curve due to the loss of pressure in the mold cavity. The periods from t1 to t3 indicate the injection step. During this time, the pressure in the cavity rapidly increases and the operator needs to perform the pressure control in this stage of the process. The periods from t3 to t4 indicate the pressure holding step. The hold pressure in this step is affected by the injection and switching pressure, position, and velocity from the previous step. The value of the hold pressure determines the effectiveness and performance of the pressure holding. The periods from t4 to t5 indicate the cooling step where the melt solidifies and the mold still experiences some remaining pressure.

Figure 6:
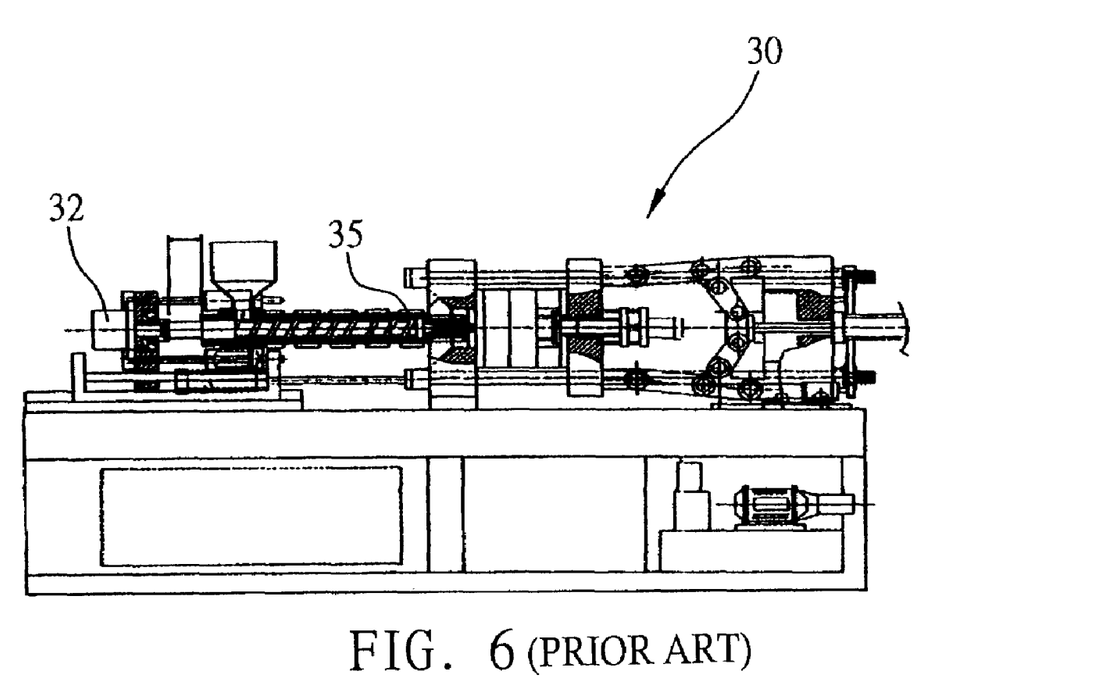
FIG. 6 is a side view of an hydraulic injection molding machine according to the present invention.

From the aforementioned, the importance of the rapid pressure variation at different positions and the pressure holding during the injection molding pressure is emphasized. In general manufacturing processes, the control and switching parameter adjustment and control is entirely dependent on the skill of experience of the process engineer. The process engineer adjusts the parameters of the formula according to the quality of the molded die or examines the accuracy of the machinery in order to achieve consistency and stability in its manufacturing. However this trial and error method is difficult to control stability and a high level of repetition during high volume manufacturing. FIG. 6 shows a conventional hydraulic injection unit 30 (powered by a hydraulic motor 32). The operation involves determining the amount of travel by a potential meter or optical ruler during the injection process. The position of the injection axle 35 can be determined anytime during the injection process. When the position of the injection axle 35 reaches the predetermined V-P switching point, the injection unit 30 will automatically switch from the filling stage to the pressure holding stage. The control accuracy of this method is different every time because the position of the injection axle 35 is not identical every time. Due to lack of correction after each injection, the injection speed in the homestretch is deviated. Furthermore after repeated usage of the injection unit 30, the process parameter of the injection unit 30 will be altered (such as fluid quality, operating temperature, and the like) and consequently affects the accuracy and repetition of the control and decreases the quality of the molded die.

Figure 7:
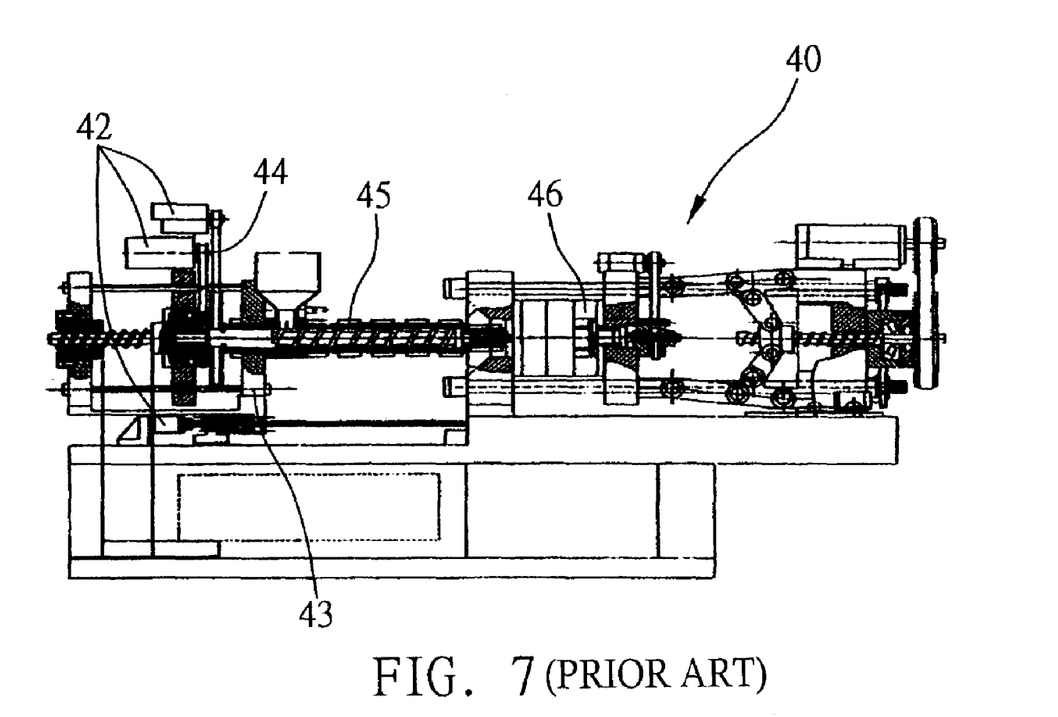
FIG. 7 is a side view of a conventional electrically-operated molding machine.
Figure 8:
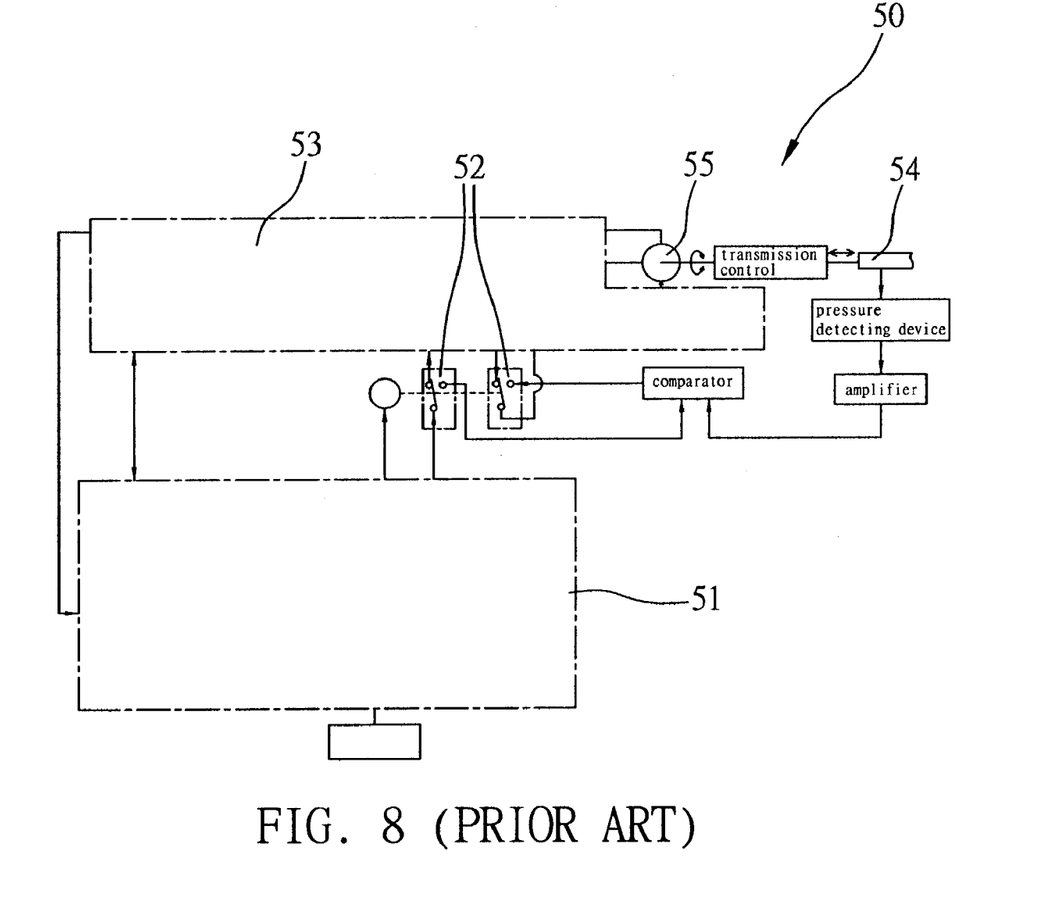
FIG. 8 is a schematic diagram of the control device used in U.S. Pat. No. 5,154,935.

In newer electrical servo injection units, FIG. 7 shows the electrical servo motor 42 which is the driving source of the injection unit 40. An AC servo controller 43 and a servo motor 42 provide high accuracy control in position and velocity and high repetition consistency for completing the requirement for V-P switching and pressure holding. Other advantages such as reduction in cost, improvement in cleanliness, and improvement in operating quietness are realized. The V-P switching and pressure holding of the electrical injection unit 40 is more accurate than the hydraulic injection unit 30. Whereas the control method includes using a pressure control device to perform pressure close loop control for maintaining the injection filling pressure and hold pressure at a certain predetermined level for example in U.S. Pat. No. 5,154,935. In FIG. 8, a comparator compares the actual pressure to the operator-inputted target pressure curve in the control unit 51 and outputs the comparison result to servo loop 53 by two external switchable looping switches 52. The comparator therefore performs a closed-loop pressure control on the servomotor 55 that is coupled to the injection shaft 54 for maintaining a certain injection and hold pressure. Although the electrically-operated injection molding machines can eliminate the shortcomings of the hydraulic molding machines, they still possess problems such as manufacturing quantity because the device 50 can only perform closed-loop pressure control but cannot govern the injection speed and the injection shaft position. This method cannot effectively perform a smooth switching from the injection phase to the pressure holding phase because the selection of the switching position cannot be optimized and stabilized. Furthermore besides the pressure related characteristic parameter cannot be easily adjusted, the delay in the executing the switching order is significant because the switchable looping switches 52 of the conventional device 50 is designed to be external of the hardware.

SUMMARY OF THE INVENTION

An object of the present invention is to provide a electrical injection V-P switching device and method thereof suitable for an electrically-operated injection molding machine for easily adjusting the V-P switching.

Another object of the present invention is to provide a V electrical injection-P switching device and method thereof suitable for an electrically-operated injection molding machine for precisely determining the V-P switching position.

Another object of the present invention is to provide a electrical injection V-P switching device and method thereof suitable for an electrically-operated injection molding machine for maintaining a stable pressure hold for the plastic piece.

Another object of the present invention is to provide a electrical injection V-P switching device and method thereof suitable for an electrically-operated injection molding machine for smooth and fast looping.

In order to achieve the above objects, the present invention provides a electrical injection V-P switching device and method thereof suitable for an electrically-operated injection molding machine, comprising: a drive control unit that is coupled to the servo motor of the electrically-operated injection machine, a velocity controller, a value control unit that is coupled to the drive control unit via switchable loop switches, and a position controller and a pressure controller that are coupled to the loop switches to switch between the closed-loop formed by the value control unit and the drive control unit and the closed-loop formed by the pressure controller. That is the switching between the injection process and the pressure holding process of the injection molding machine. Wherein when the value control unit and the drive control unit form a closed-loop position control, the value control unit can perform a V-P switching of the injection machine to perform switching at the optimal V-P parameters for completing the closed-loop pressure control.

The present invention provides a electrical injection V-P switching method for an electrically-operated injection molding machine. The machine comprises a drive control unit that is coupled to the injection axle and a value control unit. The steps of the method comprise: planning for multi-stage injection velocity for injection and multi-stage hold pressure for pressure holding, and reduce the injection velocity of the injection axle at the final stage of the injection; setting the point X as the V-P switching point when the injection velocity is zero, and also setting up an observation value D for the V-P switching; switching the loop switch of the value control unit to generate a closed-loop position control for the value control unit and the drive control unit; inputting position order to the value control unit according to the injection planning to initiate the injection molding machine to complete the planned injections; determining the position error e between the actual injection axle position and the point X by the value control unit, and determining if the position error is less than observation value D, if yes performing V-P switching, if no adjusting the parameters for optimal V-P switching and performing switching upon adjustment; switching the loop switch of the value control unit to form a closed-loop pressure control from the value control unit and the drive control unit; inputting pressure hold command to the value control unit according to the hold pressure plan to make the injection molding machine complete the pressure hold process.

The aforementioned optimal V-P switching parameters comprises the optimal position, the time, the pressure, the velocity, and the like for V-P switching. The optimal parameters for V-P switching also depend on the setup of the user which are obtained from the requirement and experience of the user. Wherein when the value control unit determines that the position error e is larger than the observation value D, the new optimal V-P switching position is obtained by adjusting for example the observation value D or the switching point X by determining if the pressure is too high or low after comparing the actual switching pressure by an external pressure detection unit. This can prevent the degradation of quality due to non-optimal switching parameters.

Therefore the present invention provides an electrical injection V-P switching device and method thereof suitable for an electrically-operated injection molding machine.

The user performs minor adjustments on the V-P switching parameters during the slow down stages before the filling to ensure precise tuning of the switching position and other V-P switching parameters for obtaining ideal hold pressure results. At the same time, because the switchable loop switches are disposed inside the value control unit, therefore the internal loops can perform smooth, fast switching with high repetition consistency, and other electrical control characteristics. The present invention successfully solves the quality problem found in control device in the prior art.

DESCRIPTION OF THE PREFERRED EMBODIMENT

Figure 1:
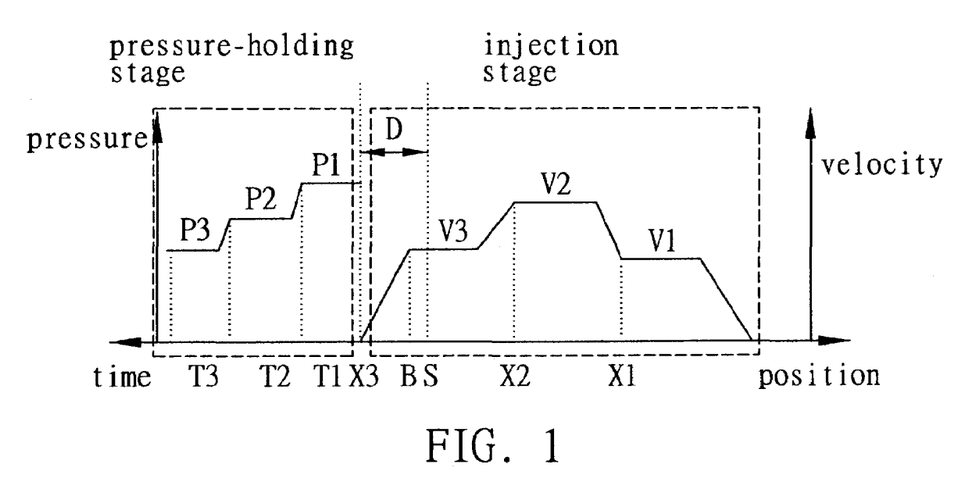
FIG. 1 is a schematic diagram showing the set up of the injection parameters according to a preferred embodiment of the present invention.

FIG. 7 shows the injection molding machine 40 of the present invention. The drive source comes from a servo motor 42 which is driven by a belt 44 or screw-type axle 45 driven by a gear mechanism to hold pressure on the mold 46 for solidification after the plastic is injected in it. The V-P switching and hold pressure control during the injection stage is the most important in determining the quality of the plastic piece. The V-P switching and hold pressure control device I of the present invention is used on the servo controller of these injection molding machines to precisely determine the switching position, pressure, velocity and the like parameters. In order to fully describe the preferred embodiment, please refer to the setup of the parameters in FIG. 1 as an example. The injection parameters are separated into different stages with three stages of injection control and three stages of pressure hold control. The stages and their corresponding values are limited to what is disclosed in this embodiment and can be modified according to the requirement of the user. In common practice, there are about 5 stages of injection and hold pressure control (each stage refill and circulated). If the injection process is not divided into stages and is done by a one-time full-blast method, it might overload and the plastic piece will experience flash and other quality problems. FIG. 1 shows the predefined stages with three injection velocity for plastic melt filling Vi, V2, and V3, wherein the switching position of V2 and V3 are point X1 and X2 on the injection axle respectively, the magnitude of the injection velocity is dependant on the requirement of the user. If the injection velocity is too high, the heat will burn the surface of the plastic affecting the overall surface finish, if the velocity is too low, an overfill will generate obvious parting lines. Furthermore the injection axle during in the injection process will move backwards due to the force, therefore the legend of the axle position is read as larger to the right. When the injection axle passes position B, the injection velocity is lowered to increase the flexibility in the minor adjustment of the V-P switching parameters. This embodiment defines the position S (from S=X3+D) for the injection molding machine to perform V-P switching, wherein D represents the observation value D for V-P switching which is either first pre-defined by the user or minimally adjusted during the process to determine the actual switching position. X3 is a defined switching point (X3 is only an actual switching point when D=0). Following, when the injection axle enters the hold pressure status, the mold enters three stages of hold pressure control P1, P2, and P3 with the hold pressure time divided into Ti, T2, and T3 to press and solidify the plastic melt. Compensatory plastic might experience shrinkage but with a longer hold pressure time the chances of plastic piece shrinkage is lowered. The control device in FIG. 1 shows the control command of the control device of the present invention, the values and other exemplary items can be modified according to the requirement of the user.

Figure 2:
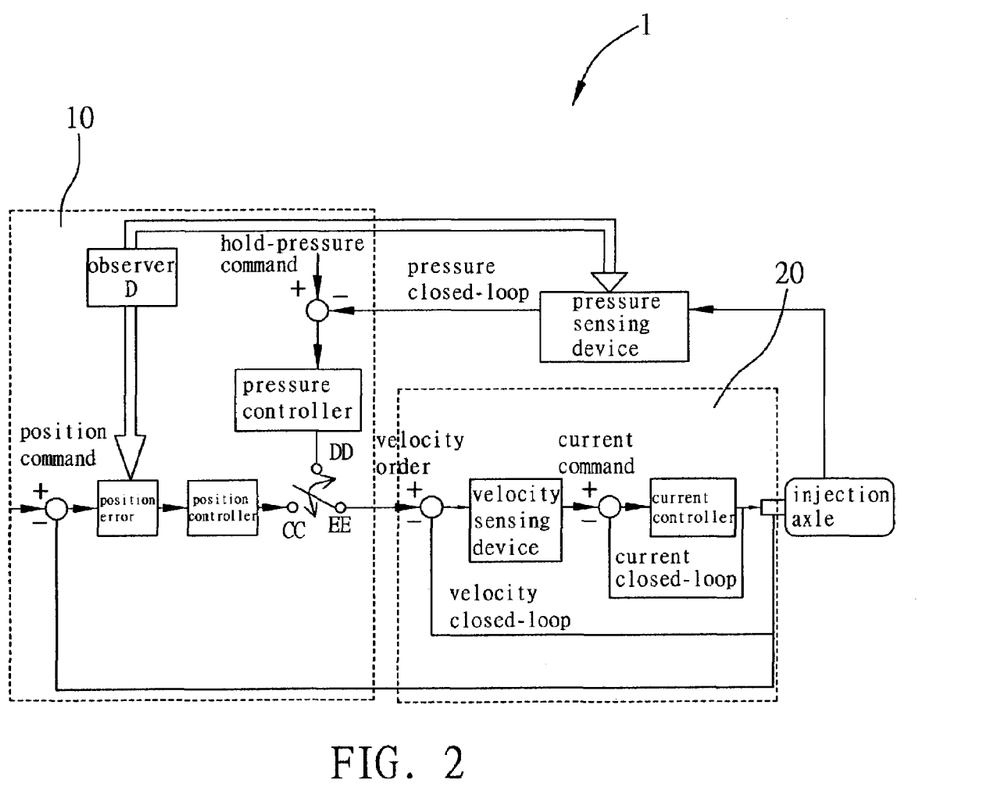
FIG. 2 is a schematic of the control device according to a preferred embodiment of the present invention.

The V-P switching device for an electrically-operated injection molding machine using the V-P switching method shown in FIG. 1 is illustrated in FIG. 2. The V-P switching device comprises a value controller 10 and a servo motor controller 20. A current controller and a position controller are electrically coupled to the servo motor 42 (FIG. 7) and the injection axle. At same time, the value controller 10 has three closed-loop connections CC, DD, BE so the servo motor controller 20 can variably control the connection to the value controller 10 to form either a closed-loop position control or a closed-loop pressure control. The value controller 10 comprises the position controller and the pressure controller to control the pressure and the position of the servo motor. This embodiment also provides an observation element which is coupled to a pressure detection element that detects the actual pressure of the injection axle for determining the switching position of the V-P switching. Wherein the position, pressure, velocity, current controller can facilitate the actual situation and perform related closed-loop control according to the position, pressure, velocity, and current commands from the user. Therefore when the injection molding machine is performing injection filling, connection EB and connection CC are coupled to render closed-loop position control on the servo motor. This stage shows the predefined control parameter (position command) in FIG. 1. From the beginning injection position X3, a plan for the progress movement of the injection axle is performed. A fixed sampling time is used to input a corresponding position value to the position controller by the position command until all the position commands for the position plan is completed. This closed-loop position control provides precise position accuracy and the velocity control of the injection axle by the closed-loop velocity control provides precise control of the velocity of the servo motor. This ensures the accuracy of the position control and the stability of the velocity control during the injection filling stages. After the three stages of injection velocity control is completed in FIG. 1, the injection position should be at the point X3 but however it usually does not reach the point X3 (due to the deviation in the injection speed, the inert nature of the injection axle, the filling time, and the inert nature of the plastic melt). The difference between the two positions generate a position error e and the observation element in the value controller 10 determines the position error e. According to the predefined observation value D of the V-P switching, the operator determines if V-P switching can be directly performed (that is if e is less than D), or if the observation element needs to make minor adjustment of the switching parameters according to the detection from the pressure detection element. For example, the adjustments may include switching to hold pressure control earlier to prevent hold pressure being over high. Because the injection velocity is planned during switching (point B in FIG. 1) so the switching speed can be selected anywhere from V3 to 0 to increase the flexibility and timing for the user to make minor adjustments after experiment or according to actual conditions to obtain the most stable switching. Following, after minor adjustments of the parameters made to the injection molding machine and entering the hold pressure status, the connection EB and the connection DD in the value controller 10 are coupled together and cut off from connection CC to render a closed-loop pressure control. The control method of the servo motor is changed from position command to velocity command. The velocity command of the servo controller 20 is determined based on the pressure controller in the value controller 10. The input values equal to those that are previously entered for the pressure commands (that is P1, P2, and P3 in FIG. 1) minus the actual rebound force picked up by the pressure detection element until the hold pressure time ends (Ti, T2, and T3) to complete the injection molding process. The control device 1 can switch between closed-loop position control and closed-loop pressure control according to the switching point and setup of the observation element and can provide minor adjustments to the V-P switching parameters to precisely achieve a better switching position. Furthermore the connection points (CC, DD, and EE) are disposed inside the controller hardware so the switching between the circuits is smooth and fast to decrease reaction time for a better control characteristics.

Figure 3:
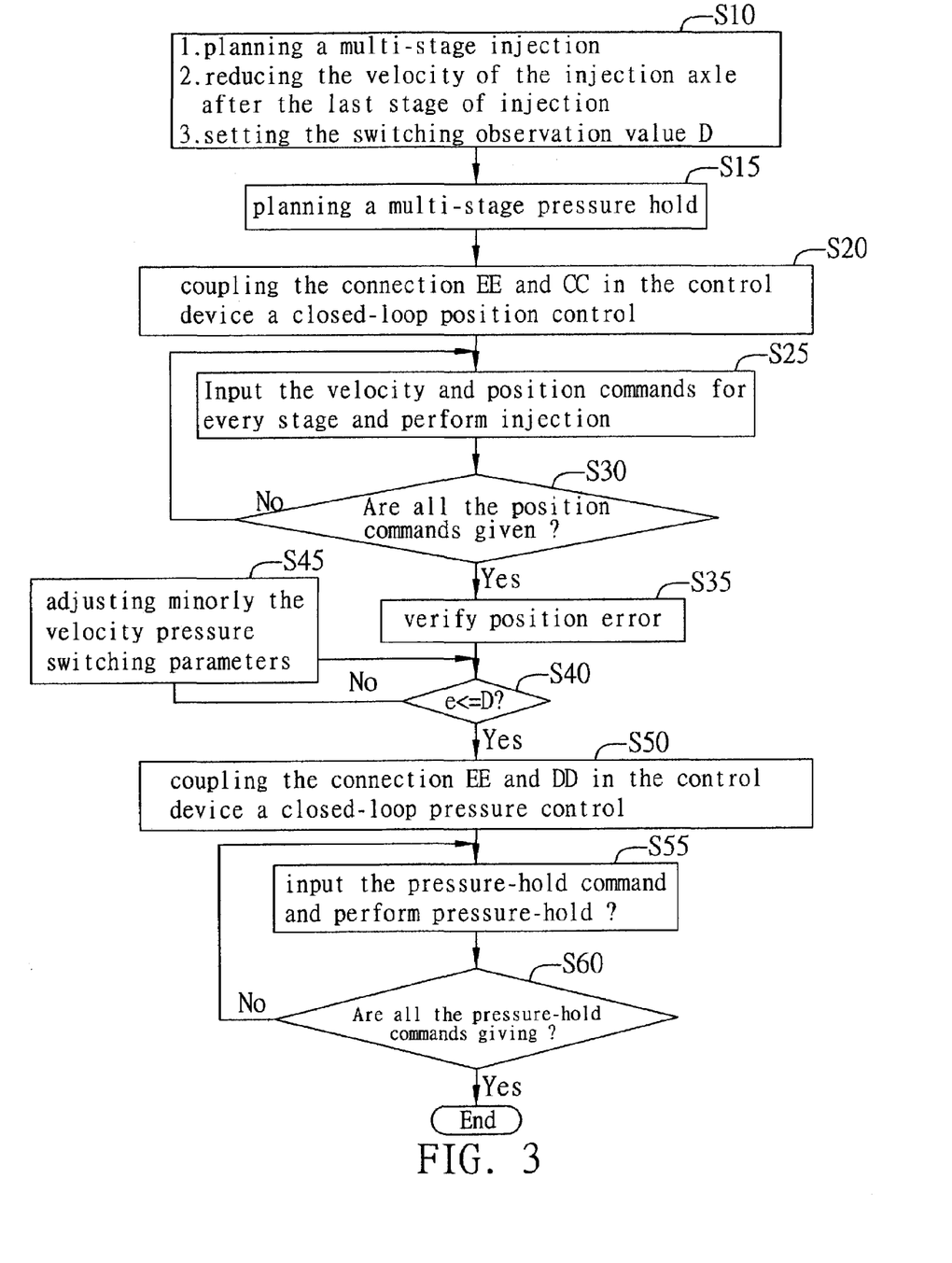
FIG. 3 is the flow diagram of the control device in FIG. 2 according to a preferred embodiment of the present invention.
Figure 4A:
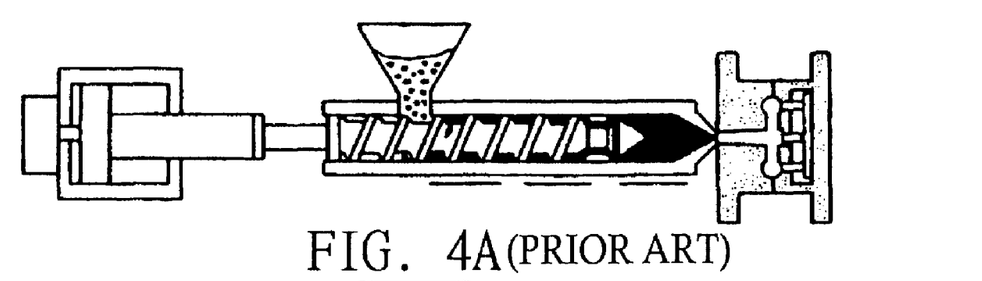
FIGS. 4A to 4E are the flow diagrams of a conventional injection molding machine.
Figure 4B:
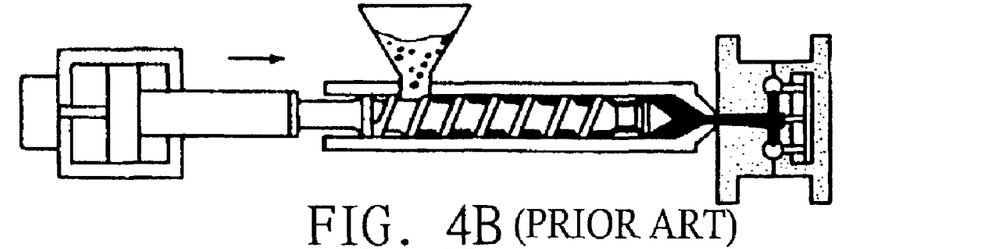
Figure 4C:
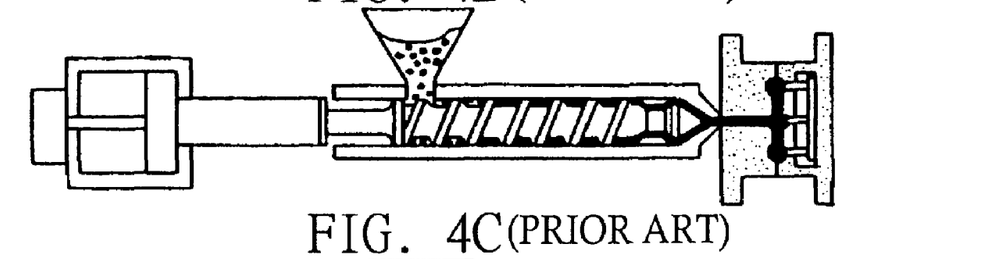
Figure 4D:
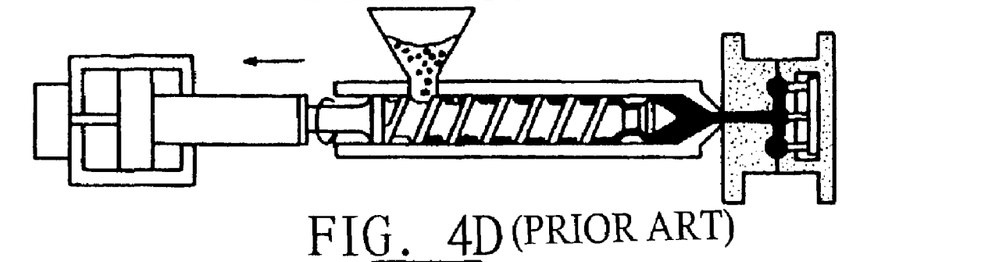
Figure 4E:
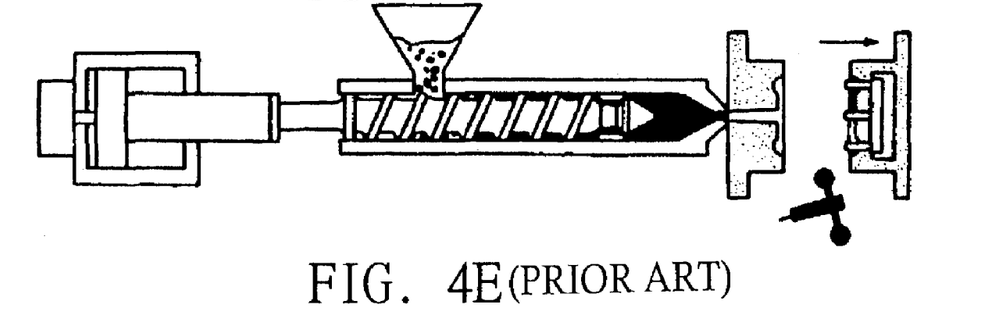

The V-P switching and hold pressure control method of the control device 1 in this embodiment is illustrated in the flow diagram in FIG. 3. The initial injection position is set at point X3 and is used as a track. At the end of the filling in the stage with velocity V3, after point B, the injection axle starts to decrease velocity until it reaches point X3 with a velocity of 0. An observation value D is entered at last. Similarly in step S15 according to the multi-stage hold pressure plan in FIG. 1, in step S20, the connection EE and the connection CC are coupled to form a closed-loop position control; in step S25, the injection filling starts according to the injection velocity position command of every stage; in step S30, determine if all predefined commands are completed, if completed proceed to step S35; determine the position error e between the actual position and the predefined position X3; in step S40, determine if the position error e is less than or equal to the predefined observation value D, if yes the injection axle performs V-P switching and the V-P switching position is the point by adding the position error e to the point X3 in FIG. 1, the switching position is the point S in the diagram; in step S40, if the result is no, proceed to step S45 to perform minor adjustment on the V-P switching parameters, the adjustment is dependent on the actual pressure detected by the pressure detection element, the user can adjust according to experimental results (for example to alter the value of D), after the final stage with the injection velocity V3 (position B), the injection axle starts to decrease speed to allow plenty of time and flexibility for making the minor adjustments for better switching pressure (switching position), go to step S50; in step S50, the coupling between the connection EE and CC is terminated and the coupling between the connection EE and DD is made to establish a closed-loop pressure control; in step 55, the planned pressure holding closed-loop control in FIG. 1 is applied, the hold pressure commands are entered to complete hold pressure; in step S60, after the hold pressure process is finished, the injection molding process is done. This control method can engage in position and closed-loop pressure controls during the injection filling and hold pressure processes by switching the connection points to carry out the predefined control parameters. At the same time, the user is given plenty of flexibility to make precise adjustment to the required parameters to obtain an accurate switching position by decreasing the speed before entering the hold pressure stage and the use of the observation value D.

In the above-mentioned injection filling process, after all the position commands are entered and the injection axle is decreasing speed from V3, if the observation element knows that the position error e is larger than the observation value D, the manufacture engineer will make adjustments to the V-P switching parameters under this non-ideal switching status. The method of adjustment are based on the requirement of the user on the injection molding and the actual situation or are by experience. The following shows an actual application of the aforementioned adjustment of the parameters. The user defines the point X3 which is the predefined V-P switching position in FIG. 1. The point X3 is also the actual switching position if D is zero, that is the position of the injection axle when the velocity is zero. At velocity equals zero, the flow of plastic melt may not be continuous because the actual pressure is usually not the ideal pressure (due to the variation of switching speed). Therefore a predefined observation value D of the V-P switching is introduced for making minor adjustments. After the value controller complete all the position commands and the injection process, if the position error e is larger than the value of D, the actual pressure from the pressure detection element is used as a reference. If the switching pressure is too high, the value of D can be increased to allow the injection axle to switch earlier at a lower ideal pressure. Therefore the value of D affects the magnitude of the adjustment of the switching position. The user can adjust the settings and make adjustment to the value of D according to the difference in the actual pressure and the ideal pressure, or make minor adjustments to the switching pressure, position, velocity, and the like parameters between the injection velocity of V3 to 0 according to experience.

Oppositely if the actual pressure from the pressure detection element is too low, the switching pressure needs to be increased. The position of point X3 can be reestablished and it is adjusted backwards (decreasing the value in the horizontal axis) to extend the switching time and position for increasing the switching pressure. The aforementioned only demonstrates one way of performing minor adjustments, the user can use other adjustment methods according to his requirement after the injection velocity decreases from V3 to make changes to obtain better switching pressure, position, and velocity, and improve the filling of the plastic melt and the quality of the products.

Summarizing the above, the present invention provides a V-P switching system and method for an electrically-operated injection molding machine which allows engineers to make V-P switching adjustments before the completion of the filling by making adjustments to the V-P switching parameters in an easy and precise manner for better hold pressure results. Furthermore the internal circuitry ensures smooth and fast switching between connections. High repetition consistency is achieved and the control is not easily affected by environmental and machinery factors to increase the quality of the products and to solve the problems in the prior art.

What is claimed is:

1. A velocity-pressure switching and pressure holding device for use in an electrically-operated injection molding machine, comprising:
    a drive control unit for driving a motor coupled to an injection axle, the drive control unit controlling operation of the injection axle, wherein the drive control unit further comprises a velocity controller; and
    a value control unit coupled to a switchable loop switch and the drive control unit, wherein the value control unit further comprises a position controller and a pressure controller that are coupled to the switchable loop switch, and switching of the switchable loop switch activates switching between a closed-loop position control formed by the value control unit and the drive control unit and a closed-loop pressure control, said switching representing switching between an injection process and a pressure hold process;
    wherein when the value control unit and the drive control unit form the closed-loop position control, the value control unit performs velocity-pressure switching of the injection molding machine so as to form the closed-loop pressure control by the switching of the switchable loop switch at optimal velocity-pressure switching parameters that are dependent on settings of a user.

2. The device in claim 1, wherein the optimal velocity-pressure switching parameters comprise optimal values of a switching position, a switching time, a switching pressure, and a switching velocity.

3. The device in claim 1, wherein the control device further comprises a pressure detection element for detecting a pressure of the injection axle and sending an actual pressure back to the value control unit.

4. The device in claim 3, wherein the value control unit further comprises an observation element for determining a position error e which is a difference between an actual position of the injection axle and a predefined position of the injection axle.

5. The device in claim 4, wherein when the value control unit performs the velocity-pressure switching, a predefined observation value D for velocity-pressure switching is adjusted according to the actual pressure received from the pressure detection element to obtain the optimal velocity-pressure switching parameters depending on experience of the user.

6. The device in claim 1, wherein the position controller receives a position command and to perform closed-loop position according to a position detected by the drive control unit.

7. The device in claim 1, wherein the pressure controller receives a pressure command and to perform closed-loop pressure control according to a pressure received from the pressure detection element.

8. The device in claim 1, wherein the velocity controller receives a velocity command and to perform a closed-loop velocity control by the drive control unit according to a speed.

9. The device in claim 1, wherein the drive control unit further comprising a current controller, the current controller receives a current command and to perform a closed-loop current control by the drive control unit according to a current.

10. The device in claim 1, wherein the motor of the drive control unit is a servo motor.

\* \* \* \* \*